United States Patent [19]

Ohnishi et al.

[11] Patent Number: 5,444,131

[45] Date of Patent: Aug. 22, 1995

[54] POLYMERIZATION PROCESS WITH RECYCLE LINE CONTAINING SCREEN WITH RODLIKE PROJECTION

[75] Inventors: Shuji Ohnishi, Lake Jackson, Tex.; Yoichi Tanifuji, Matsudo; Tadashi Amano, Kamisu, both of Japan

[73] Assignee: Shin-Etsu Chemical Co., Ltd., Tokyo, Japan

[21] Appl. No.: 233,822

[22] Filed: Apr. 26, 1994

[30] Foreign Application Priority Data

Apr. 26, 1993 [JP] Japan .................................. 5-121973

[51] Int. Cl.$^6$ .................................................. C08F 14/06
[52] U.S. Cl. .......................................... 526/67; 526/74; 526/344.2
[58] Field of Search ......................... 526/67, 74, 344.2

[56] References Cited

U.S. PATENT DOCUMENTS 5,200,476  4/1993  Sosa et al. ............................... 526/67
5,328,666  7/1994  Amano et al. ........................ 422/132

Primary Examiner—Joseph L. Schofer
Assistant Examiner—Tom Weber
Attorney, Agent, or Firm—Oblon, Spivak, McClelland, Maier, & Neustadt

[57] ABSTRACT

A polymerization apparatus that is equipped with a circulation path for the flow of a reaction mixture that comprises a polymerization vessel, a heat exchanger arranged outside said polymerization vessel, and a pipeline that is extended from said polymerization vessel, is returned to said polymerization vessel through said heat exchanger, and is provided with a strainer in the course thereof, wherein the surface of a filter provided in said strainer that is located upstream has rodlike projections, and a method of producing a polymer of a monomer having an ethylenically unsaturated double bond by using said apparatus. Scale and polymers in the form of blocks can be prevented from mixing into the reaction mixture. Therefore, where the obtained sheet is molded into a sheet or the like, fish eyes can be reduced and even if the polymerization is repeated, clogging of the tubes of the heat exchanger and dropping in the flow velocity of the reaction mixture can be prevented.

3 Claims, 6 Drawing Sheets

POLYMERIZATION PROCESS WITH RECYCLE LINE CONTAINING SCREEN WITH RODLIKE PROJECTION

BACKGROUND OF THE INVENTION

Field of the Invention

The present invention relates to a polymerization apparatus for polymerizing a monomer having an ethylenically unsaturated double bond that carries out the polymerization while the reaction mixture is circulated through a heat exchanger that is arranged separately from the polymerization vessel.

Description of the Prior Art

Polymerization of a monomer having an ethylenically unsaturated double bond is carried out in such a manner that a polymerization medium, such as water, a dispersant, a polymerization initiator, the monomer having an ethylenically unsaturated double bond, and, if required, other various additives are charged into a polymerization vessel equipped with a jacket and a reflux condenser, then the inside temperature of the polymerization vessel is elevated, and the polymerization reaction is carried out while the temperature is kept at a constant temperature. To keep the inside of the polymerization vessel at a constant temperature during that polymerization reaction, since it is required to remove the heat of the polymerization reaction, cooling water is circulated through the jacket and the reflux condenser.

In recent years, in order to improve productivity, it is carried out (1) to make a polymerization vessel large and (2) to shorten the polymerization time per batch. However, as the polymerization vessel is made large, the rate of the heat transfer area to the reaction mixture per unit volume is decreased, and therefore the above-mentioned conventional method of removing the heat of polymerization reaction is insufficient in heat removing capacity. Further, if the polymerization time per batch is shortened, the exotherm rate of the polymerization reaction per unit time increases, and therefore the heat removing capacity becomes further insufficient.

To overcome this disadvantage, several methods are suggested and, among them, an effective method includes a method wherein a reaction mixture is circulated through a heat exchanger arranged outside a polymerization vessel (see Japanese Pre-examination Patent Publication (kokai) Nos. 24991/1979, 47410/1981, and 32606/1983 and Japanese Patent Publication (kokoku) No. 11642/1989). This method is quite effective in that the rate of the heat transfer area to the reaction mixture per unit volume can be made large.

However, this method has a problem in view of the operation and quality in that tubes of the heat exchanger are clogged with polymer scale or polymers in the form of blocks produced in the polymerization vessel and in the circulation path comprising the heat exchanger and a pipeline connecting the heat exchanger and the polymerization vessel or where the obtained polymer is molded, for example, into a sheet, fish eyes increase.

Therefore, the present inventors found a method wherein a strainer is arranged in the course of the pipeline to catch peeled polymer scale and polymers in the form of blocks. However, although this method can prevent the tubes of the heat exchanger from being clogged until the polymerization are repeated in about 2 or 3 batches, where the number of batches of the polymerization exceeds the above number, the filter installed in the strainer is clogged with paperlike scale to cause the flow velocity of the reaction mixture to drop and finally the circulation of the reaction mixture is stopped in some cases, which is a disadvantage.

SUMMARY OF THE INVENTION

Therefore, an object of the present invention is to provide a polymerization apparatus for polymerizing a monomer having an ethylenically unsaturated double bond that is equipped with a circulation path comprising a polymerization vessel, a heat exchanger arranged outside said polymerization vessel, and a pipeline that is extended from said polymerization vessel and is returned to said polymerization vessel through said heat exchanger, wherein if the polymerization is repeated, clogging of tubes of the heat exchanger and dropping in the flow velocity of the reaction mixture can be prevented and where the obtained polymer is molded, for example, into a sheet, fish eyes can be reduced, and a method of producing a polymer of the above monomer by using the above polymerization apparatus.

The inventors of the present invention have studied keenly and have attained the above object.

The present invention provides a polymerization apparatus that is equipped with a circulation path for the flow of a reaction mixture that comprises a polymerization vessel, a heat exchanger arranged outside said polymerization vessel, and a pipeline that is extended from said polymerization vessel, then is returned to said polymerization vessel through said heat exchanger, and is provided with a strainer in the course thereof, wherein the surface facing upstream of a filter provided in said strainer has rodlike projections.

The present invention also provides a method of producing a polymer which comprises polymerizing a monomer having an ethylenically unsaturated double bond using a polymerization apparatus that is equipped with a circulation path for the flow of a reaction mixture that comprises a polymerization vessel, a heat exchanger arranged outside said polymerization vessel, and a pipeline that is extended from said polymerization vessel, is returned to said polymerization vessel through said heat exchanger, and is provided with a strainer in the course thereof, wherein the surface facing upstream of a filter provided in said strainer has rodlike projections.

By the present polymerization apparatus, since scale and polymers in the form of blocks produced and peeled, for example, in the circulation path can be caught, they can be prevented from being mixed into the reaction mixture. Therefore, according to the present method of producing a polymer by using said polymerization apparatus, where the obtained polymer is molded, for example, into a sheet, fish eyes can be reduced.

Further, the present polymerization apparatus can improve productivity since clogging of tubes of the heat exchanger and dropping in the flow velocity of the reaction mixture can be prevented even if the polymerization is repeated.

DETAILED DESCRIPTION OF PREFERRED EMBODIMENTS

Filters

Figure 1:
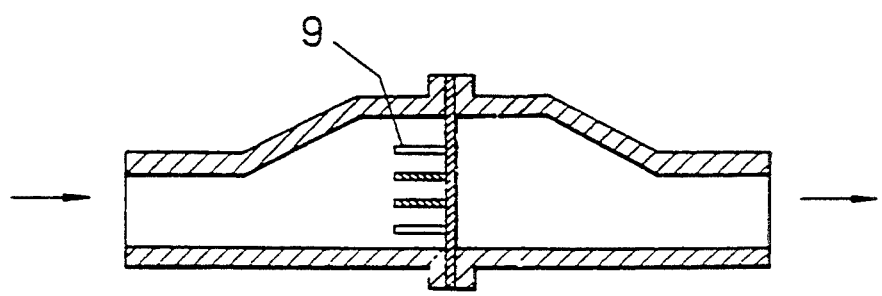
FIG. 1 is a vertical cross section of a strainer having therein a filter with rodlike projections that will be arranged in the present polymerization apparatus, the cross section passing through the center line of the pipeline and the strainer.

Inside the strainer provided in the present polymerization apparatus is provided a filter having rodlike projections.

As the filter, a filter having smooth surfaces and a plurality of openings, such as a perforated metal and a metal having holes made by a drill is used.

There can be various shapes of the openings of the filter. FIGS. 4 to 9 exemplify filters made of a metal 7 having openings 8 with various shapes, but the present invention is not restricted to them. The filters shown in FIGS. 4 and 5 have the openings 8 that are square in shape, the filters shown in FIGS. 6 and 7 have the openings 8 that are circular in shape, and the filters shown in FIGS. 8 and 9 have the openings 8 that are oblong in shape.

The size of the openings of the filter is smaller than the inner diameter of tubes of the heat exchanger and is large enough not to obstruct the flow of the reaction mixture (the inner diameter of tubes of a heat exchanger is generally of the order of 10 to 60 mm. Although the linear velocity of the flow of the reaction mixture is generally 0.5 m/sec or over in order to prevent polymer particles in the reaction mixture from settling out, the linear velocity of the flow of the reaction mixture is preferably 0.5 to 2.5 m/sec since polymer scale is liable to deposit on the peripheries of the openings of the filter if the linear velocity is too high.) Preferably use is made of a filter wherein the major diameter of said opening is smaller than the inner diameter of the tubes of the heat exchanger. The minor diameter of the openings is generally of the order of 5 to 30 mm. Herein the term "major diameter" means the longer side of the rectangular that circumscribes one opening (that rectangular should be one having the smallest area) and the term "minor diameter" means the shorter side of the rectangular.

The number of the openings of the filter is set by taking into consideration, for example, the above size of the openings and the linear velocity of the flow of the reaction mixture and the size of the filter is set accordingly.

Said filter is provided with rodlike projections. Preferably the rodlike projections are provided on the upstream surface of the filter so that when the filter is placed in a strainer, they may be directed longitudinally of the pipeline and the strainer (i.e., in the direction of the flow of the reaction mixture). The rodlike projections can be attached, for example, by welding them to the metal part of the filter or by forming threaded holes in the metal part of the filter and screwing the rodlike projections.

Preferably the rodlike projections are attached throughout the surface of the filter with a suitable interval between them (generally one rodlike projection is in an area of 10 mm$^2$ to 50 mm$^2$), but they may be attached to part of the filter, for example, to the lower half of the filter.

Preferably the length of the rodlike projections is of the order of 0.1 to 1.5 times the inner diameter (generally 3 to 16 inches). Further, use may be made of rodlike projections all of which have the same length or use may be made of a combination of rodlike projections different in length.

Figure 10A:
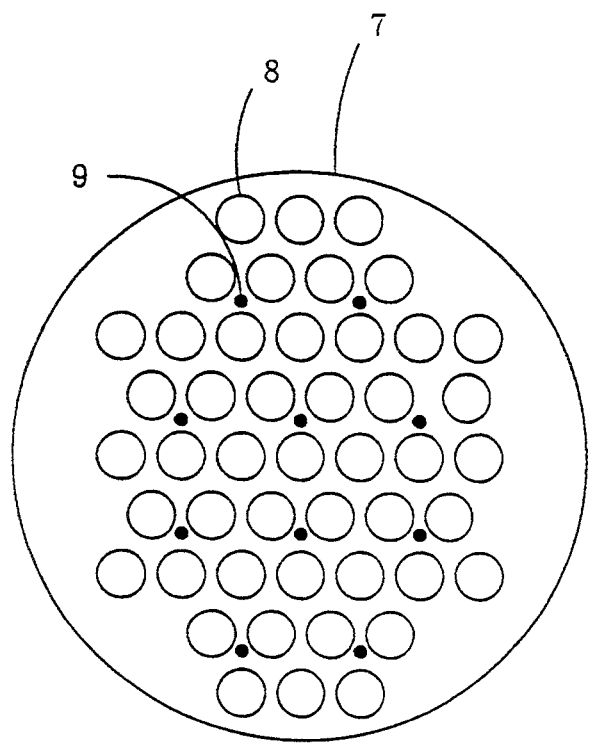
FIG. 10 is a diagram showing a filter having a plurality of rodlike projections throughout the surface of the filter; FIG. A is a front view of the filter seen from the side where the rodlike projections are extended; and FIG. B is a side view taken when FIG. A is seen in the direction of the arrow.
Figure 10B:
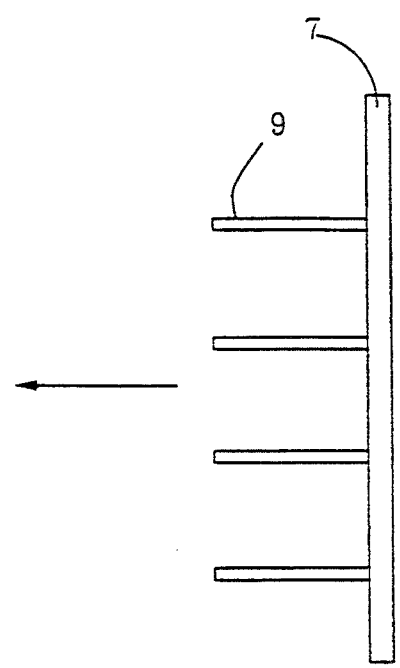
Figure 11A:
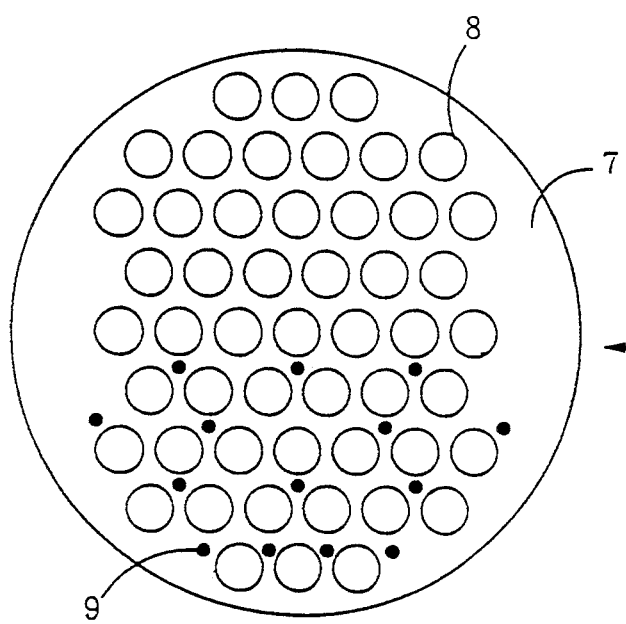
FIG. 11 is a view showing a filter having a plurality of rodlike projections on the lower half surface of the filter; FIG. A is a front view of the filter seen from the side where the rodlike projections are extended; and FIG. B is a side view taken when FIG. A is seen in the direction of the arrow.
Figure 11B:
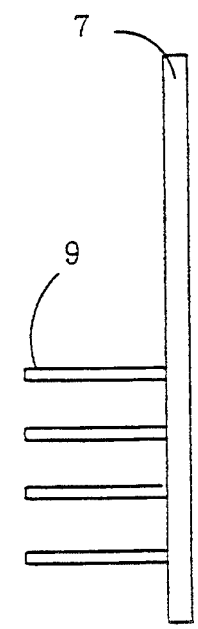

FIGS. 10 and 11 exemplify filters having a plurality of rodlike projections 9. Therein FIG. A is a front view of the filter seen from the side where the rodlike projections 9 are extended (for the sake of clarity the rodlike projections are shown at shaded circles; and FIG. B is a side view taken when FIG. A is seen in the direction of the arrow.

FIG.10 exemplifies a filter wherein a plurality of rodlike projections 9 having the same length are attached throughout the surface of the filter with a suitable interval between them. FIG. 11 exemplifies a filter wherein a plurality of rodlike projections 9 having the same length are attached to the lower half surface of the filter with a suitable interval between them. As described above, the rodlike projections 9 may be a combination of rodlike projections different in length.

Strainers

The strainer used in the present polymerization apparatus is provided with the above filter having the rodlike projections. Generally, the filter is placed so that when the strainer is placed in the course of the pipeline of the polymerization apparatus, the filter surface may be vertical to the longitudinal direction of the pipeline and the strainer. The strainer can also be placed so that when the strainer is arranged in the course of the pipeline of the polymerization apparatus, the filter surface may be inclined upstream.

Figure 2:
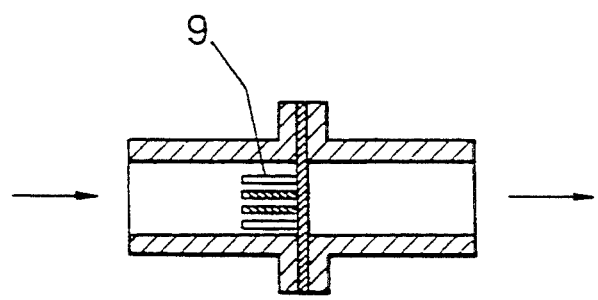
FIG. 2 is a vertical cross section of a strainer having therein a filter with rodlike projections that will be arranged in the present polymerization apparatus, the cross section passing through the center line of the pipeline and the strainer.
Figure 3:
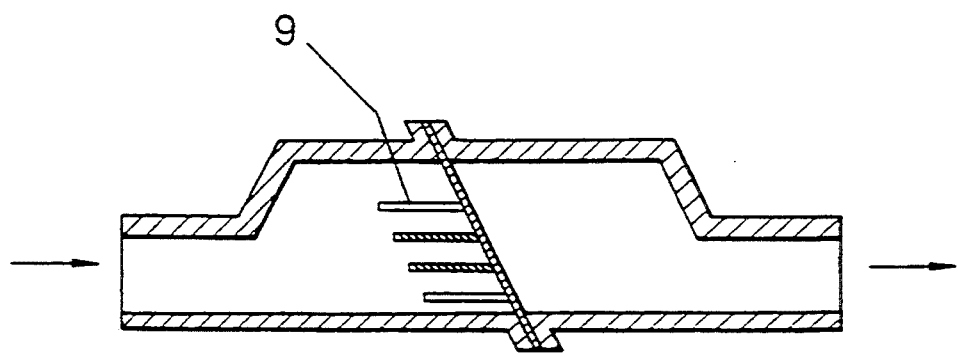
FIG. 3 is a vertical cross section of a strainer having therein a filter with rodlike projections that will be arranged in the present polymerization apparatus, the cross section passing through the center line of the pipeline and the strainer.
Figure 4:
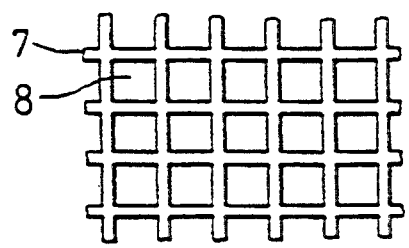
FIG. 4 is a diagram showing a filter of which openings are square in shape.
Figure 5:
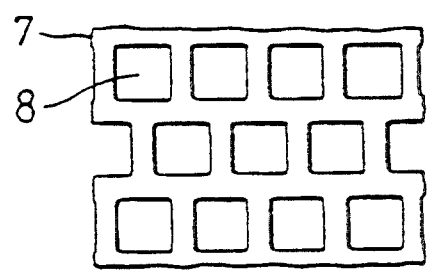
FIG. 5 is a diagram showing a filter of which openings are square in shape.
Figure 6:
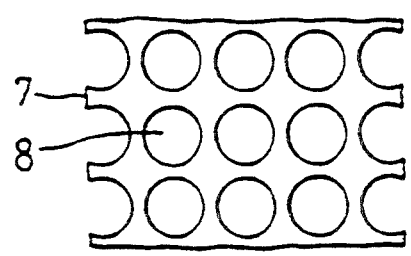
FIG. 6 is a diagram showing a filter of which openings are circular in shape.
Figure 7:
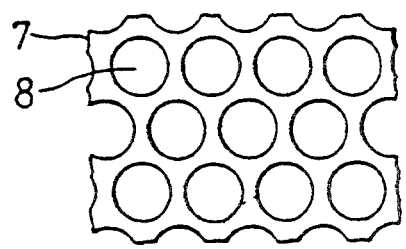
FIG. 7 is a diagram showing a filter of which openings are circular in shape.
Figure 8:
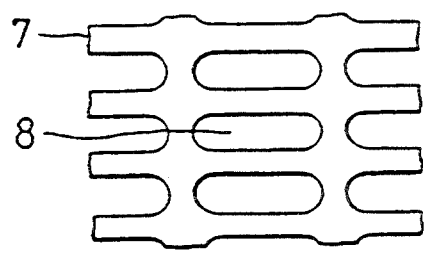
FIG. 8 is a diagram showing a filter of which openings are oblong in shape.
Figure 9:
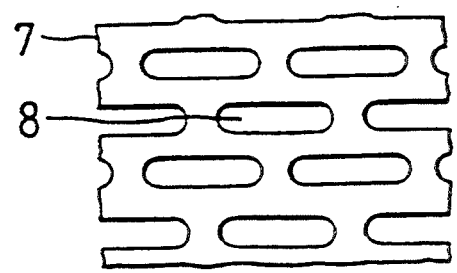
FIG. 9 is a diagram showing a filter of which openings are oblong in shape.

It is suitable that the strainer has a structure that does not allow the reaction mixture to stay. FIGS. 1 to 3 are diagrams exemplifying an in-line type of strainers each having a filter provided with rodlike projections 9 and the diagrams are vertical cross sections passing through the center line of the pipeline and the strainer. FIG. 1 is a vertical cross section of a strainer that is provided with the filter shown in FIG. 10 and wherein the inner diameter of the part where the filter is located is larger than the inner diameter of the pipeline. FIG. 2 is a vertical cross section of a strainer that is provided with the filter shown in FIG. 10 and wherein the inner diameter of the part where the filter is located is equal to the inner diameter of the pipeline. Further, FIG. 3 is a vertical cross section of a strainer that has a part of which inner diameter is larger than the inner diameter of the pipeline and is placed so that the filter surface of the filter may be inclined upstream (that is, the angle between the upstream surface of the filter and the direction of the flow of the reaction mixture may be an acute angle); the filter is provided with rodlike projections directed longitudinally of the pipeline and the strainer (that is, approximately in the direction of the flow of the reaction mixture). The arrows in FIGS. 1 to 3 show the direction of the flow of the reaction mixture.

The above strainer having the filter provided with the rodlike projections is placed in the course of the pipeline so that the surface of the filter where the rodlike projections are provided may be directed upstream. Generally, as the heat exchanger, a multitubular (shell-and-tube) heat exchanger comprising a tubular casing and a plurality of thin tubes housed in said casing is used since, for example, the maintenance is easy and the pressure loss is small, and a heating or cooling medium is passed outside the tubes and while the reaction mixture is passed through the tubes, the heat exchange is carried out. Since the inner diameter of the tubes in the heat exchanger is smaller than the inner diameter (generally of the order of 3 to 16 inches) of the pipeline, the tubes are easily clogged. Therefore, in order to prevent the tubes in the heat exchanger from being clogged, preferably the strainer is placed between the bottom of the polymerization vessel and the inlet of the heat exchanger. Further, preferably the strainer is placed nearer the heat exchanger as much as possible so long as the positioning of the strainer between the bottom of the polymerization vessel and the inlet of the heat exchanger does not lead to a problem.

The polymerization apparatus

Now, the present invention will be described specifically with reference to the figures exemplifying the polymerization apparatus of the present invention.

Figure 12:
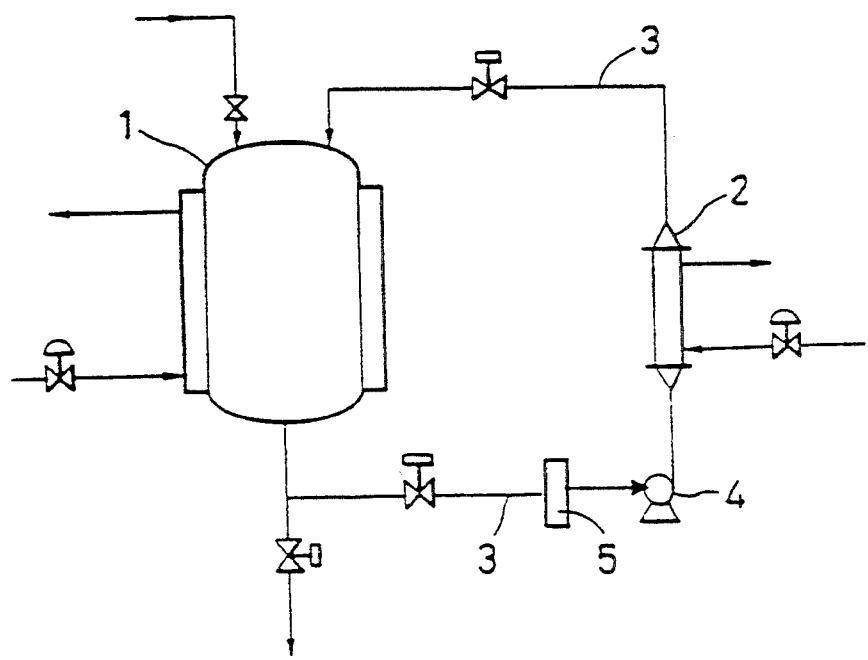
FIG. 12 is a diagram exemplifying schematically the whole of the present polymerization apparatus.

FIG. 12 exemplifies a schematic diagram of the whole of the polymerization apparatus according to the present invention and the present polymerization apparatus is equipped with a polymerization vessel 1, a heat exchanger 2 for heating or cooling a reaction mixture, and a circulation pipeline 3 that is led from the bottom of the polymerization vessel 1 and is returned through the heat exchanger 2 to the polymerization vessel 1. The present polymerization apparatus is also equipped with a circulating pump 4 in the course of the circulation pipeline 3. Further the polymerization apparatus has a strainer 5 placed in the course of the circulation pipeline 3 between the polymerization vessel 1 and the heat exchanger 2.

In the polymerization apparatus of the present invention, by the circulating pump 4 an aqueous reaction mixture made up, for example, of a monomer, an aqueous medium, a dispersant, and an oil-soluble polymerization initiator is taken out from the bottom of the polymerization vessel 1 to be brought through the circulation pipeline 3 to the heat exchanger 2 where it is cooled or heated and is returned to the gaseous phase or the liquid phase in the polymerization vessel 1 again through the circulation pipeline 3. Polymer scale and polymers in the form of blocks peeled off during the circulation of the reaction mixture are caught by the strainer 5.

As the polymerization vessel 1 in the polymerization apparatus of the present invention, a conventionally known type of polymerization apparatus can be used that is provided, for example, with an agitator, a reflux condenser, baffles, or a jacket. In the agitator, use is made of agitating blades, for example, of a paddle type, a Pfaudler type, a Brumagin type, a propeller type, or a turbine type, which is used, if necessary, in combination with baffles, such as cylinders and hair pin coils.

As the heat exchanger 2, a generally used heat exchanger, for example, of a multi-tubular type, a coil type, a spiral type, or a trombone cooler type can be applied and as its heating or cooling medium, for example, steam, cooling water, and brine can be used. Further, the circulation pipeline 3 itself may be a double pipe and a cooling water or brine may be passed through its outer gap to increase the efficiency of the heat removal.

It is recommended that the circulating pump 4 is of a low-shearing type and preferably is a pump having a structure with an impeller comprising a single helical blade attached to a conical hub. As a pump having such a structure, for example, a pump commercially available under the trade name of "Hidrostal Pump" (manufactured by Taiheiyo Kinzoku-sha) can be mentioned.

Preferably, the polymerization vessel 1, the heat exchanger 2, the circulation pipeline 3, the circulating pump 4, the strainer 5, and other parts with which the reaction mixture will come in contact, such as valves, are made of a stainless steel, for example, of the "18-8" austenire series, the "13" chromium ferrite series, the martensite series, the "18" chromium ferrite series, the high-chromium ferrite series, or the Dual-phase austenire/ferrite series in view of the heat transfer and the corrosion resistance. Also these parts may be coated with a conventionally known polymer scale prevention agent or the polymer scale prevention agent may be added to the aqueous suspension mixture.

The monomer having an ethylenically unsaturated double bond to be polymerized in the polymerization apparatus of the present invention includes, for example, a vinyl halide, such as vinyl chloride; a vinyl ester, such as vinyl acetate and vinyl propionate; acrylic acid and methacrylic acid and their esters or salts; maleic acid and fumaric acid and their esters and anhydrides; a diene monomer, such as butadiene, chloroprene, and isoprene; styrene, acrylonitrile; a vinylidene halide; and a vinyl ether. The polymerization apparatus of the present invention is suitable for the polymerization particularly of vinyl chloride out of the above monomers or a monomer mixture whose major component is vinyl chloride (which monomer mixture generally contains vinyl chloride in an amount of 50 wt. % or more). Examples of the comonomer that can be copolymerized with the vinyl chloride include an α-olefin, such as ethylene, propylene, 1-butene, 1-pentene, 1-hexene, 1-heptene, 1-octene, 1-nonene, 1-decene, 1-undecene, 1-dodecene, 1-tridecene, and 1-tetradecene; an acrylic acid or its ester, such as acrylic acid, methyl acrylate, and ethyl acrylate; a methacrylic acid or its ester, such as methacrylic acid, methyl methacrylate, and ethyl methacrylate; maleic acid or its ester; a vinyl ester, such as vinyl acetate and vinyl propionate; a vinyl ether, such as lauryl vinyl ether and isobutyl vinyl ether; maleic anhydride; acrylonitrile, styrene, vinylidene chloride, and other monomer copolymerizable with vinyl chloride, which may be used singly or as a combination of two or more.

The polymerization apparatus of the present invention is suitable for polymerization in an aqueous medium, such as suspension polymerization and emulsion polymerization, and particularly suitable for suspension polymerization of a vinyl chloride or a monomer mixture whose major component is vinyl chloride.

Now, the general polymerization method using the polymerization apparatus of the present invention will be described specifically below with reference to suspension polymerization and emulsion polymerization by way of example.

First, water and a dispersant are charged into the polymerization vessel equipped with a jacket. Thereafter, the inside of the polymerization vessel is evacuated to be brought to a pressure of 0.1 to 760 mmHg and then a monomer is charged thereinto. At that time the internal pressure of the polymerizing vessel will become generally 0.5 to 30 kgf/cm$^2$·G. A polymerization initiator is charged before and/or after the charging of the monomer. Then, by passing hot water through the jacket to elevate the temperature in the polymerization vessel to 30° to 150° C., the polymerization reaction is started. Then, cooling water is passed through the jacket and the reaction mixture in the polymerization vessel is circulated through the heat exchanger placed outside, so that the polymerization is carried out while the inside of the polymerization vessel is kept at the above temperature. If the linear velocity of the circulation of the reaction monomer is too low, since deposition of scale is liable to be accelerated, preferably the linear velocity of the circulation of the reaction monomer is 0.7 m/sec or more. During the polymerization, if necessary, water, a dispersant, and one or more polymerization initiators are added. The reaction temperature of the polymerization varies depending upon the type of the monomer to be polymerized, and, for instance, in the case of polymerization of vinyl chloride, the polymerization is carried out at 30° to 80° C., and on the other hand, in the case of polymerization of styrene, the polymerization is carried out at 50° to 150° C. It is judged that the polymerization has been completed when the internal pressure of the polymerization vessel has dropped to 0 to 7 kgf/cm$^2$·G or the difference between the inlet temperature and the outlet temperature of the cooling water flowing into and out from the jacket has become nearly zero (i.e., when the generation of heat due to the polymerization reaction has stopped). After the completion of the polymerization, the unreacted monomer is recovered and the produced polymer is removed outside the polymerization vessel. The water, the dispersant, and the polymerization initiator that are charged at the time of the polymerization are generally in amounts of 20 to 500 parts by weight, 0.01 to 30 parts by weight, and 0.01 to 5 parts by weight respectively per 100 parts by weight of the monomer.

The polymerization initiator used in the present invention may be a polymerization initiator conventionally used for polymerization of a monomer having an ethylenically unsaturated double bond, and the polymerization initiator used in producing vinyl chloride type polymers includes, for example, a peroxycarbonate, such as diisopropyl peroxydicarbonate, di-2-ethylhexyl peroxydicarbonate, and diethoxyethyl peroxydicarbonate; t-butyl peroxyneodecanate, t-butyl peroxypivalate, t-hexyl peroxypivalate, α-cumyl peroxyneodecanate, and 2,4,4-trimethylpentyl peroxy-2-neodecanate; a perester compound, such as t-hexyl peroxyneodecanoate, 1-cyclohexyl-1-methylethyl peroxyneodecanoate, (α, α'-bisneodecanoylperoxy)-diisopropylbenezene, and 1,1-dimethyl-3,3-hydroxybutyl peroxyneodecanoate; a peroxide, such as acetylcyclohexylsulfonyl peroxide, 2,4,4-trimethylpentyl-2-peroxyphenoxyacetate, 3,5,5-trimethylhexanoyl peroxide, lauroyl peroxide, and isobutyl peroxide; an azo compound, such as azobis-2,4-dimethylvaleronitrile, and azobis(4-methoxy-2,4-dimethylvaleronitrile) as well as potassium persulfate, ammonium persulfate, hydrogen peroxide, and cumene hydroperoxide, which may be used singly or as a combination of two or more.

As the dispersant used in the present invention, the conventionally known dispersant can be used and particularly the dispersant used in producing a vinyl chloride type polymer includes, for example, a water-soluble cellulose ether, such as methyl cellulose, ethyl cellulose, hydroxyethyl cellulose, hydroxypropyl cellulose, and hydroxypropylmethyl cellulose; water-soluble and oil-soluble partially saponified polyvinyl alcohols; a water-soluble polymer, such as an acrylic acid polymer and gelatin; an oil-soluble emulsifier, such as sorbitan monolaurate, sorbitan trioleate, sorbitan monostearate, glycerin tristearate, and an ethylene oxide/propylene oxide block copolymer; a water-soluble emulsifier, such as a polyoxyethylenesorbitan monolaurate, a polyoxyethyleneglycerin oleate, and sodium laurate; calcium carbonate, calcium phosphate, and sodium dodecylbenzenesulfonate, which are used singly or as a combination of two or more.

Other conditions used in the polymerization, for example, the way of charging, for example, the aqueous medium, the monomer, the polymerization initiator or the dispersing agent and the ratio of them to be charged may be the same as those conventionally used. To this polymerization system are optionally added, as required, for example, a polymerization regulator, a chain transfer agent, a pH adjustor, a gelation improver, an antistatic agent, a crosslinking agent, a stabilizer, a filler, an antioxidant, a buffering agent, and a polymer scale prevention agent that are suitably used in polymerizing a vinyl chloride type monomer.

EXAMPLES

Specific modes of the present invention will be described below with reference to the following Examples and Comparative Examples, but the present invention is not restricted to them.

Example 1

Figure 13A:
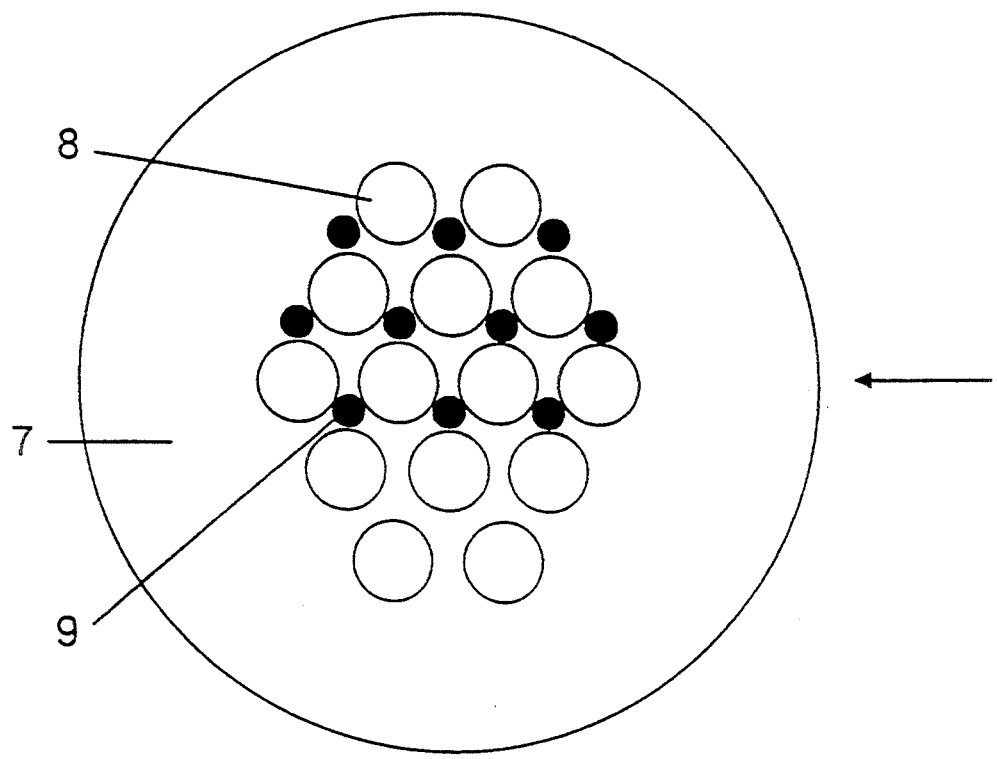
FIG. 13 is a diagram showing the filter used in Example 1; FIG. A is a front view seen from the side where the rodlike projections are extended; and FIG. B is a side view taken when FIG. A is seen in the direction of the arrow.
Figure 13B:
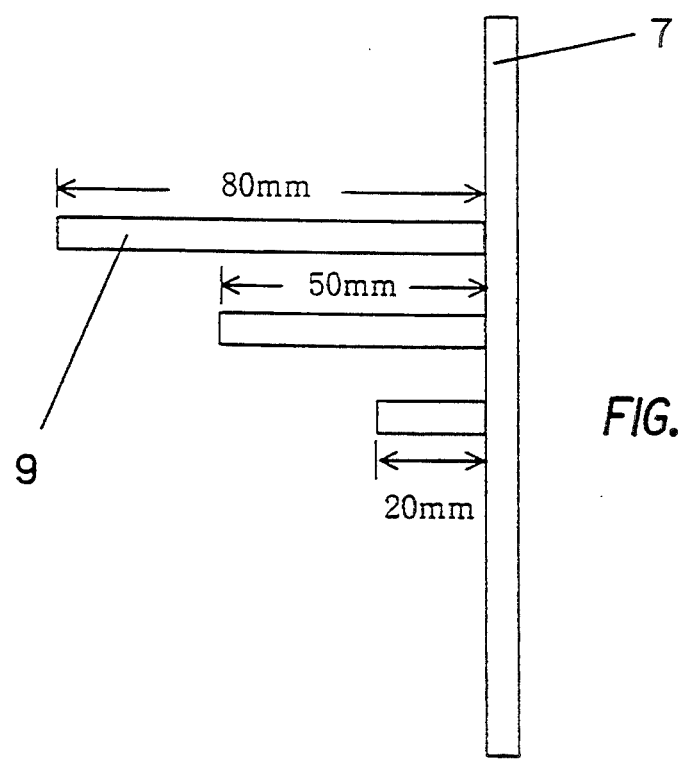

As is shown in FIG. 12, a jacketed polymerizing vessel 1 of a stainless steel having an inner volume of 2.1 m$^3$, a shell-and-tube multitubular heat exchanger (the tube inner diameter: 22.2 mm) having a heating surface area of 5.0 m$^2$, a Hidrostal Pump 4 (the flow velocity: 5 m$^3$/hr; the head: 2 m; equipped with a flow rate variable apparatus that uses an inverter) as a circulating pump, and a strainer (having the structure shown in FIG. 1)

equipped with a filter (the diameter of the filter: 137 mm; the thickness of the filter: 6 mm; the diameter of the opening: 15 mm; the distance between the centers of the openings: 19 mm; the number of the openings: 14; the number of the rodlike projections having a diameter of 6 mm and a length of 80 mm: 3; the number of the rodlike projections having a diameter of 6 mm and a length of 50 mm: 4; and the number of the rodlike projections having a diameter of 6 mm and a length of 20 mm: 3) as shown in FIG. 13 were connected through a pipeline 3 (the inner diameter: 81.1 mm), valves, etc.

An aqueous solution of 840 kg of deionized water, 240 g of a partially saponified polyvinyl alcohol, and 160 g of a cellulose ether were charged into the above polymerization vessel. After the inside of the polymerization vessel was deaerated to 50 mmHg, 670 kg of vinyl chloride monomer was charged and then 2010 g of di-2-ethylhexyl peroxydicarbonate was pumped thereinto with stirring. Thereafter, hot water was passed through the jacket of the polymerization vessel to elevate the temperature in the polymerization vessel. After the start of the polymerization reaction, cooling water was passed through the jacket and after 30 min the circulation of the reaction mixture in the polymerization vessel through the outside was started with the linear velocity of the flow being 1.3 m/sec and at the same time cooling water at 30° C. was supplied to the heat exchanger at a rate of 10 m$^3$/hr. While the internal temperature of the polymerization vessel was kept at 55° C., the polymerization was carried out, and when the internal pressure of the polymerization vessel dropped to 6.5 kg/cm$^2$·G, the reaction was terminated. Then, the unreacted monomer was recovered and the produced vinyl chloride polymer in the form of a slurry was taken out from the polymerization vessel and was dehydrated and dried.

With respect to the obtained vinyl chloride polymer, the bulk specific gravity, the particle size distribution, the plastisizer take-up, and the number of fish eyes of the sheet molded therefrom were determined in accordance with the following methods, the results being shown in Table 1.

(1) Bulk specific gravity: the measurement was done in accordance with JIS K 6721.

(2) Particle size distribution: the product was shifted by using #60, #80, #100, #150, and #200 sieves conformed to JIS Z 8801 and the passed amounts (% by weight) were measured.

(3) Plastisizer take-up: the bottom of an aluminum alloy container having an inner diameter of 25 mm and a depth of 85 mm was filled with glass fiber and a 10 g sample of the vinyl chloride polymer was taken and placed thereon. 15 cc of dioctyl phthalate (hereinafter referred to as DOP) was added thereto and they were allowed to stand for 30 min thereby permitting the DOP to permeate the polymer sufficiently. Thereafter, the excess DOP was centrifuged under an acceleration of 1,500 G, the amount of DOP absorbed into the 10 g of the polymer was measured and the obtained value was multiplied by 10.

(4) Fish eyes: 25 g of a mixture prepared by formulating 100 parts by weight of the vinyl chloride polymer, 50 parts by weight of dioctyl phthalate, 0.5 part by weight of tribasic lead sulfate, 1.5 parts by weight of lead stearate, 0.1 part by weight of titanium oxide, and 0.05 part by weight of carbon black was kneaded for 5 min at 140° C. by a kneading 6-inch roll to form a sheet having a width of 15 cm and a thickness of 0.2 mm. The number of transparent particles per 100 cm$^2$ of the obtained sheet was counted.

Also, the state in the circulation path after the completion of the polymerization was checked and the results are shown in Table 1.

Five batches of the above polymerization in all were repeated and with respect to the obtained vinyl chloride polymer of the fifth batch, the bulk specific gravity, the particle size distribution, the plastisizer take-up, and the number of fish eyes of the sheet molded therefrom were determined in the same manner as described above, the results being shown in Table 1.

Also, the state in the circulation path after the completion of the fifth batch was checked and the results are shown in Table 1.

Comparative Example 1

Example 1 was repeated, except that the strainer was not installed, thereby carrying out one batch of the polymerization.

With respect to the obtained vinyl chloride polymer, the bulk specific gravity, the particle size distribution, the plastisizer take-up, and the number of fish eyes of the sheet molded therefrom were determined in the same manner as in Example 1, the results being shown in Table 1.

When the state in the circulation path after the completion of the polymerization was checked, the tubes of the heat exchanger were filled with polymers in the form of transparent blocks and polymer scale deposited and grew on parts in the circulation path, so that it was impossible to repeat the polymerization further.

Comparative Example 2

Example 1 was repeated, except that in place of the strainer used in Example 1 a strainer equipped with a filter having no rodlike projection was used, thereby carrying out one batch of the polymerization.

With respect to the obtained vinyl chloride polymer, the bulk specific gravity, the particle size distribution, the plastisizer take-up, and the number of fish eyes of the sheet molded therefrom were determined in the same manner as in Example 1, the results being shown in Table 1.

Also, the state in the circulation path after the completion of the polymerization was checked and the results are shown in Table 1.

Five batches of the polymerization in all were repeated and with respect to the obtained vinyl chloride polymer, the bulk specific gravity, the particle size distribution, the plastisizer take-up, and the number of fish eyes of the sheet molded therefrom were determined in the same manner as in Example 1, the results being shown in Table 1.

Also, the state in the circulation path after the completion of the fifth batch was checked and the results are shown in Table 1.

TABLE 1

|  | Example 1 | | Comp. Ex. 1 | Comp. Ex. 2 | |
| --- | --- | --- | --- | --- | --- |
|  | After one batch | After five batches | After one batch | After one batch | After five batches |
| Bulk specific | 0.530 | 0.525 | 0.521 | 0.527 | 0.520 |

TABLE 1-continued

| | | Example 1 | | Comp. Ex. 1 | Comp. Ex. 2 | |
|---|---|---|---|---|---|---|
| | | After one batch | After five batches | After one batch | After one batch | After five batches |
| gravity | | | | | | |
| Particle size distribution (passed amount in % by weight) | #60 | 100 | 100 | 99.5 | 100 | 99.8 |
| | #80 | 67.1 | 66.0 | 65.3 | 66.1 | 62.3 |
| | #100 | 43.2 | 35.5 | 42.8 | 39.5 | 30.4 |
| | #150 | 9.8 | 5.8 | 13.5 | 8.5 | 14.9 |
| | #200 | 0.5 | 0.4 | 1.1 | 0.4 | 1.2 |
| Plasticizer take-up (g) | | 24.0 | 23.6 | 23.8 | 23.6 | 23.4 |
| fish eyes (number) | | 4 | 6 | 180 | 7 | 78 |
| State in the circulation path | | 22 g of polymer scale in the form of blocks was cought in the strainer. The tubes of the heat exchanger were not clogged. A small amount of scale deposited on parts in the circulation path. | 47 g of polymer scale in the form of blocks was caught in the strainer. Five sheets of paperlike polymer scale having an area of about 6 cm² were cought by the projections of the filter. The tubes of the heat exchanger were not clogged. A small amount of scale was deposited on parts in the circulation path. | The tubes of the heat exchanger were clogged with polymers in the form of transparent blocks. Polymer scale deposited and grew on parts in the circulation path. | 27 g of polymer scale in the form of blocks was caught in the strainer. The tubes of the heat exchanger were not clogged. A small amount of scale deposited on parts in the circulation path. | The openings of the filter were covered with paperlike scale and the filter was clogged. |

We claim:

1. A method of producing a polymer which comprises polymerizing a monomer having an ethylenically unsaturated double bond using a polymerization apparatus that is equipped with a circulation path for the flow of a reaction mixture that comprises a polymerization vessel, a heat exchanger arranged outside said polymerization vessel, and a pipeline that is extended from said polymerization vessel, is returned to said polymerization vessel through said heat exchanger, and is provided with a strainer in the course thereof, wherein the surface facing upstream of a filter provided in said strainer has rodlike projections.

2. A method of producing a polymer as claimed in claim 1, wherein said monomer is vinyl chloride of a monomer mixture whose major component is vinyl chloride.

3. A method of producing a polymer as claimed in claim 1, wherein said polymerization is suspension polymerization.

* * * * *